United States Patent
Weston

(10) Patent No.: US 8,463,491 B2
(45) Date of Patent: Jun. 11, 2013

(54) AUTOLOCATION OF ALL TIRE ID'S ON A MULTI-AXLE VEHICLE

(75) Inventor: David Alan Weston, Hendersonville, NC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 819 days.

(21) Appl. No.: 12/664,506

(22) PCT Filed: Jun. 20, 2007

(86) PCT No.: PCT/US2007/014318
§ 371 (c)(1),
(2), (4) Date: Dec. 14, 2009

(87) PCT Pub. No.: WO2008/156446
PCT Pub. Date: Dec. 24, 2008

(65) Prior Publication Data
US 2010/0179724 A1 Jul. 15, 2010

(51) Int. Cl.
*B60C 23/00* (2006.01)

(52) U.S. Cl.
USPC ........... 701/35; 340/445; 701/29.1; 701/29.6; 701/33.1; 701/33.2; 701/33.3; 701/33.4

(58) Field of Classification Search
None
See application file for complete search history.

(56) References Cited

U.S. PATENT DOCUMENTS

| | | | |
|---|---|---|---|
| 4,510,484 A | 4/1985 | Snyder | |
| 4,862,486 A | 8/1989 | Wing et al. | |
| 5,457,447 A | 10/1995 | Ghaem et al. | |
| 5,749,984 A * | 5/1998 | Frey et al. | 152/415 |
| 5,774,047 A * | 6/1998 | Hensel, IV | 340/442 |
| 6,278,363 B1 * | 8/2001 | Bezek et al. | 340/442 |
| 6,417,766 B1 * | 7/2002 | Starkey | 340/447 |
| 6,489,888 B1 * | 12/2002 | Honeck et al. | 340/442 |
| 6,774,778 B2 * | 8/2004 | Lin | 340/447 |
| 6,857,310 B2 * | 2/2005 | Bergerhoff et al. | 73/146 |
| 6,880,395 B2 * | 4/2005 | Norimatsu et al. | 73/146.4 |
| 6,917,286 B2 * | 7/2005 | Fonzes et al. | 340/447 |
| 6,998,974 B2 * | 2/2006 | Bergerhoff et al. | 340/444 |
| 7,006,946 B1 * | 2/2006 | Tyndall | 702/182 |
| 7,010,968 B2 * | 3/2006 | Stewart et al. | 73/146 |
| 7,023,334 B2 * | 4/2006 | Fischer et al. | 340/444 |
| 7,026,922 B1 * | 4/2006 | Talukder et al. | 340/442 |
| 7,088,226 B2 * | 8/2006 | McClelland et al. | 340/442 |
| 7,177,739 B2 * | 2/2007 | Kuchler | 701/29.6 |
| 7,289,022 B2 * | 10/2007 | Ogawa et al. | 340/447 |
| 7,367,227 B2 * | 5/2008 | Stewart et al. | 73/146 |

(Continued)

OTHER PUBLICATIONS

Related U.S. Patent Application communication.

(Continued)

*Primary Examiner* — Jonathan M Dager
(74) *Attorney, Agent, or Firm* — Dority & Manning, P.A.

(57) ABSTRACT

Disclosed is an apparatus and methodology for identifying tire locations associated with a vehicle. Sensed variations in tire related parameters are measured as a vehicle traverses a known or ascertainable travel path. Data accumulated over one or more measurement windows may be analyzed to determine the location of each individual tire associated with a vehicle. Measurements and accumulation of data may be initiated upon detection of a stationary vehicle state exceeding a predetermined time, a predetermined lateral acceleration, and/or a predetermined vehicle speed.

8 Claims, 4 Drawing Sheets

U.S. PATENT DOCUMENTS

| | | | | |
|---|---|---|---|---|
| 7,425,892 | B2* | 9/2008 | Mori et al. | 340/442 |
| 7,508,301 | B2* | 3/2009 | Christenson | 340/442 |
| 7,860,634 | B2* | 12/2010 | To et al. | 701/72 |
| 7,948,364 | B2* | 5/2011 | Lin et al. | 340/442 |
| 8,026,802 | B2* | 9/2011 | Shimura | 340/442 |
| 8,096,172 | B2* | 1/2012 | Gotschlich | 73/146 |
| 8,204,645 | B2* | 6/2012 | Weston | 701/33.9 |
| 8,258,931 | B2* | 9/2012 | Lefaure | 340/425.5 |
| 8,290,747 | B2* | 10/2012 | Hamel et al. | 702/187 |
| 2003/0145650 | A1* | 8/2003 | Juzswik et al. | 73/146 |
| 2003/0197603 | A1* | 10/2003 | Stewart et al. | 340/442 |
| 2003/0197604 | A1* | 10/2003 | Ogawa et al. | 340/445 |
| 2003/0209064 | A1* | 11/2003 | Adamson et al. | 73/146 |
| 2005/0057346 | A1* | 3/2005 | Ogawa | 340/438 |

OTHER PUBLICATIONS

PCT International Search Report for PCT/US07/014319, dated Jul. 17, 2008.

"Time-Voltage QRS Area of the 12-Lead Electrocardiogram," Peter M. Okin et al., Journal of the American Heart Association, Apr. 1998, pp. 937-941.

* cited by examiner

AUTOLOCATION OF ALL TIRE ID'S ON A MULTI-AXLE VEHICLE

FIELD OF THE INVENTION

The present subject matter relates to vehicle wheel position location determination. More particularly, the present subject matter relates to systems and methodologies involving automatic determination of all wheel (tire) positions on a multi-axle vehicle.

BACKGROUND OF THE INVENTION

The incorporation of electronic devices with pneumatic tire structures has been shown to yield many practical advantages. Tire electronics may include sensors and other components for obtaining information regarding various physical parameters of a tire, such as temperature, pressure, number of tire revolutions, vehicle speed, etc. Such performance information may be useful in tire monitoring and warning systems, and may even be employed with feedback systems to monitor proper tire pressure levels.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system.

U.S. Pat. No. 4,862,486 (Wing et al.) also relates to tire electronics, and more particularly discloses an exemplary revolution counter for use in conjunction with automotive and truck tires.

U.S. Pat. No. 7,006,946 (Tyndall) relates to the intentional inducement of specific vibrations into a tire containing a vibration sensor to transmit information to electronics associated with the sensor.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles may be tracked using RF tag transmission, exemplary aspects of which are disclosed in U.S. Pat. No. 5,457,447 (Ghaem et al.).

In the operation of commercial truck fleets, vehicle down time can be very costly, possibly resulting in the loss of an entire payload for a time-critical shipment. Tire management is one of the principal challenges for truck fleet management. Tire longevity is greatly affected by inflation pressure maintenance. If the position of a tire ID on the vehicle is known, along with the inflation pressure, then repair and replacement can be more efficiently planned and executed.

It would be beneficial in a tire-vehicle-fleet system if pressure loss could be automatically detected and such information transmitted to fleet operation management. Knowing the tire ID, the rate of pressure loss, and the position on the vehicle would permit fleet operation management to efficiently arrange the correct replacement tire size and type in an appropriate timeframe along that vehicle's route, thus minimizing down-time.

While various implementations of wheel location systems have been developed, and while various combinations of information have been wirelessly relayed from a tire or wheel assembly using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for automatically locating each tire mounted on a vehicle has been developed.

In an exemplary configuration, methodologies are provided to automatically identify mounting positions for each tire mounted on a vehicle.

In one of their simpler forms, a pattern of obstacles may be placed along a vehicle travel path so that, as a vehicle passes over the obstacles, sensors associated with individual tires generate signals that may later be analyzed to determine tire locations on the vehicle.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
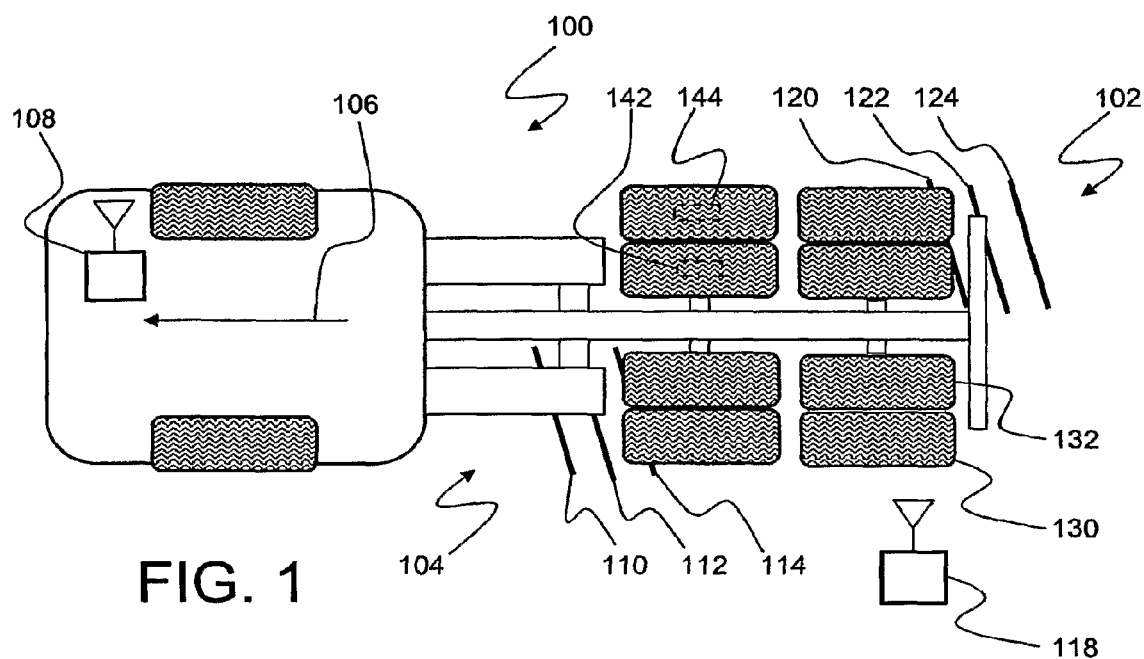
FIG. 1 illustrates a tractor rolling over a cleat array in accordance with a first exemplary embodiment of the present subject matter.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with systems and methodologies involving automatic determination of all wheel (tire) positions on a multi-axle vehicle.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The present subject matter discloses methodologies for automatically locating the wheel positions of each tire on a vehicle. Generally the methodology of the present subject matter may be described as autolocation by cleats. In accordance with the present subject matter, a vehicle is directed to roll relatively slowly over a designed array of small obstacles or cleats.

In accordance with the present subject matter, at least one piezoelectric sensor is associated with each vehicle tire. The piezoelectric sensor may be designed to attach to and integrate with the tire inner liner in such manner as to reflect the tire shape as it changes in time during rolling. The choice of location of the piezoelectric sensor in the tire should be taken into consideration when interpreting the piezoelectric sensor signal.

In accordance with the present subject matter; i.e., autolocation by cleats, the tire's counter deflection outside the contact patch is analyzed. Counter deflection varies in response to a changing load, such as when the tire rolls over a cleat, resulting in a tire shape change.

Reference will now be made in detail to the presently preferred embodiments of the subject vehicle wheel automatic location (autolocation) system and methodologies. Referring now to the drawings, FIG. 1 illustrates a tractor 100 rolling over cleat arrays 102, 104 in accordance with the present subject matter. As previously noted, the technology of the present subject matter may be termed "autolocation by cleats."

It should be appreciated by those of ordinary skill in the art that each of the tires mounted on tractor 100, or also on an associated trailer, are provided with an In Tire Electronic Module (ITEM), representatively illustrated at 142, 144, comprising at least one piezoelectric sensor. Based on signals generated by the piezoelectric sensor each ITEM produces and transmits information based at least in part on change in shape of the tire with which it is associated. In addition, each ITEM may be provided with additional information within an onboard memory. Such additional information may relate to information particular to the tire with which the sensor is associated including, but not limited to a unique identifier (ID), manufacturing information including manufacturing date and location, tire type, and other related information. For purposes of the present disclosure, it will be assumed that the sensor has at least an associated ID that may be transmitted along with collected data as well as other data including, for example, onboard clock data. More specific discussion of such known sensor types is not believed to be necessary but rather may be seen from the hereinabove noted patents which are hereby incorporated herein for all purposes.

In accordance with the present subject matter, vehicle 100 may be directed to roll slowly over a designed array of small obstacles or cleats 102, 104 which causes a predictable counter-deflection and corresponding piezoelectric signal or "cleat waveform" from each tire. These signals, or reduced descriptors of these signals, may be recorded by an ITEM in a manner which permits subsequent transmission to an Electronic Control Unit (ECU) 108 on vehicle 100 for analysis and comparison in a common time window, for example using a back-door synchronization of the various signals. This common time window, combined with knowledge of the cleat array geometry permits time-separation of all tire positions on the vehicle.

Back-door synchronization of stored data signals may be achieved by associating a time signal from a clock within each ITEM with the stored data. As data is collected, a beginning point is established based on predetermined criteria. Collected data is subsequently transmitted to ECU 108 in such a way that data from each ITEM may be compared within the exact same window of time. The predetermined criteria for starting a measurement period may correspond to a start signal from ECU 108 or also a signal from a signaling device associated with the cleat array.

In accordance with the present subject matter, the process of autolocation by cleats assumes that vehicle 100 is either entering or leaving a customer site or other designated location and will pass through cleat autolocation array 102, 104. The vehicle ECU 108 will receive an autolocation initiation signal or beacon from a controller 118 located near the array 102, 104. ECU 108 will, in turn, transmit a command to all ITEMs to begin operation according to a cleat autolocation mode. In some instances transmission from the vehicle ECU 108 may be rapidly repeated to assure that each ITEM initiates autolocation mode prior to that tire contacting the cleats. As soon as one transmission is received and autolocation mode is initiated by the ITEM, other transmissions can be ignored. Vehicle 100 may be directed to roll relatively slowly in the direction of arrow 106 over the cleat array 102, 104 to minimize vehicle perturbations and to optimize time between cleat events. This time between events will be the primary variable separating wheel positions.

Waveforms generated by shape change of the wheels as detected by the piezoelectric sensors as a wheel encounters a cleat (cleat waveforms) will normally be recorded in groups, corresponding to the cleat array number and spacing. As illustrated in FIG. 1, three slant cleats are provided in each lane corresponding cleats 110, 112, 114 in array 104 in the left lane and cleats 120, 122, 124 in array 102 in the right lane. Some cleat events may not be visible in the counter-deflection waveforms due to coincidence of piezoelectric sensor position in the tire with cleat position contacting the tire tread. This coincidental interaction can in some cases annihilate the piezoelectric sensor signal by limiting the magnitude of piezoelectric sensor shape change. With appropriate selection of cleat spacing, however, this coincidence can be limited to no more than one cleat signal.

While vehicle 100 is driven or directed through cleat array 102, 104, each ITEM will detect and record at least one of the cleat waveforms for that tire and the time(s) that detection of the cleat waveform(s) occurred. Recognition of a cleat waveform may be enhanced by control of several design factors or variables including, but not necessarily limited to; cleat shape and size; changes in cleat size, spacing and number within an array; array spacing between lanes; and cleat slant angle. Depending on cleat construction material, other variables, including, for example, the hardness and/or compressibility of the cleat material may need to be considered.

In accordance with exemplary embodiments of the present subject matter, it has been found that a cleat having a round cross-section as opposed to other shapes including, for example triangular or rectangular, produces the most uniform and predictable cleat waveform. Similarly, determination of appropriate cleat size may be determined based on the fact that cleat waveform amplitude increases with cleat height. An appropriate upper limit of cleat height may be determined by observation of mechanical crosstalk. It will be appreciated by those of ordinary skill in the art that an appropriate lower limit of cleat height may be determined by observation of sensor signal level.

Lane designation may be determined by detection of ascending-descending cleat size. Further cleat spacing and the number of cleats in a lane should be selected such that a tire or tire pair contacts only one cleat at a time. Array spacing between lanes should be configured such that any one axle will not contact cleats in both lanes at the same time.

Finally, selection of the cleat angle or slant with respect to the direction of movement of vehicle 100 creates a dual alternating load effect that produces a recognizable dual tire characteristic waveform pair that will be described further now with respect to FIG. 2.

Figure 2:
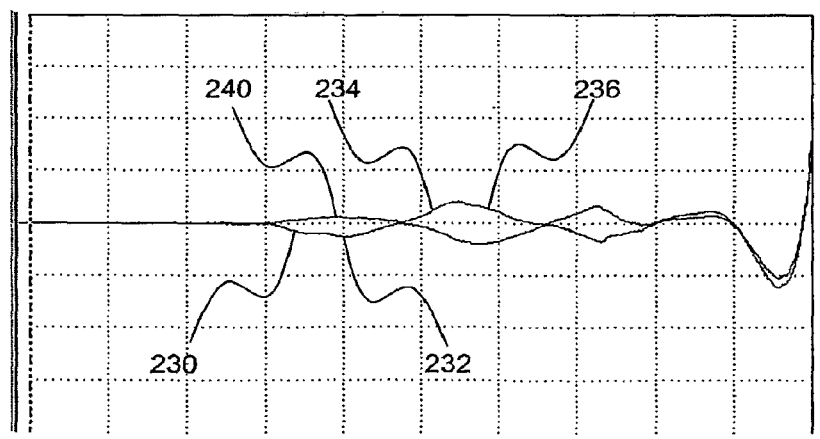
FIG. 2 graphically displays signal patterns generated as a tire passes over a cleat.

A cleat waveform, as illustrated in FIG. 2, may be detected by measuring the counter-deflection signal peak relative to zero while ignoring any opposite polarity contact patch piezoelectric sensor signal. Elimination of the contact patch signal may also be accomplished by amplitude threshold limits established during rolling immediately prior to contact with a cleat, combined with an expectation time window if needed. Such expectation time window may be determined based on first steer wheel contact and speed measurement coupled with knowledge of the vehicle geometry and the cleat contact layout.

Since a piezoelectric sensor signal can be noisy, detection may also be aided by a voltage-time integration of the signal to improve the signal to noise ratio (SNR). The voltage-time area of a signal pulse is proportional to the voltage peak amplitude. Examples of voltage-time integration applied to complex waveform SNR reduction are known and can be found in applications related to, for example, EKG signal analysis and thus will not be describe further herein.

Figure 6:
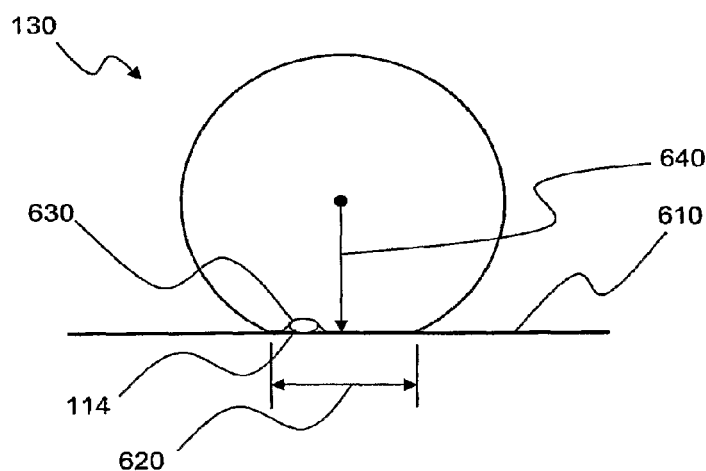
FIG. 6 generally represents a tire and associated measurement aspects related to the tire.

With reference to FIGS. 2 and 6, it will be seen that FIG. 2 graphically displays signal patterns generated as a tire passes over a cleat while FIG. 6 generally demonstrates the mechanical encounter of a tire rolling over a cleat. More particularly, the signal pattern displayed graphically illustrates signals generated by the passage of, for example, dual tire pair 130, 132 mounted on vehicle 100 as vehicle 100 is driven over cleat array 104. Dual tire pair 130, 132 is bolted together, therefore when one tire's load is momentarily increased; there is a time-corresponding decrease in the other tire's load. When, for example, tire 130 rolls over cleat 114 associated with travel path 610, the tire's load increases as seen graphically at 230 (FIG. 2) and mechanically represented at 640 (FIG. 6) until the cleat is completely enveloped as at 630 within contact patch 620 (FIG. 6).

During the time cleat 114 is completely enveloped by tire 130 as seen graphically at 232, the tire load is constant until the tire begins to roll off the cleat. During constant tire load, the piezoelectric signal bleeds off. When tire 130 rolls off cleat 114 as seen at 234, its load is decreasing so that the piezoelectric sensor sees counter-deflection decreasing. The remaining illustrated portion of the signal trace 236 represents signals generated as tire 130 passes over additional cleats in array 104.

Since, as previously mentioned, tires 130, 132 are bolted together to form a dual pair, the signals generated by their respective associated piezoelectric sensors will be substantially mirrored from one another. In this regard it may be noticed that signal trace 240 representing signals from the piezoelectric sensor associated with tire 132 substantially mirrors those previously described from the piezoelectric sensor associated with tire 130.

Cleat waveform analysis and comparison will occur after the vehicle exits the cleat array 102, 104. Each ITEM will transmit to ECU 108, a data packet describing its cleat array encounter. That data packet will contain the time(s), i.e., the ITEM clock time, of each waveform detected, the elapsed time between detection and transmission (ITEM clock time), and the ITEM ID. This data packet will permit the ECU to compare all ITEM's cleat event times in the ECU-normalized time frame, i.e. in a common measurement time window.

In addition, since more than one waveform is likely to be detected, the peak value or voltage-time area of each pulse is transmitted. The ECU may be configured to compare all pulse areas received from all ITEMs and delete any pulses which differ from the average pulse area by more than a predetermined value. The ECU may also compare and rank by magnitude all voltage-time areas for each ITEM. Ascending vs. descending areas for cleat events may be used to provide corroborating evidence of left vs. right lane identification.

"Cleat event time" can be either a single cleat time or an average of all cleat times detected by an ITEM. Tire position may be determined by simply ordering the cleat event times transmitted in view of knowledge of the array geometry for both lanes. Other normally occurring variables including, but not limited to, tire size, pressure, dual pair pressure differences, and tire wear, do not appear to have a significant impact on tire location determination. Those of ordinary skill in the art will appreciate from the forgoing that variations in cleat spacing and lane longitudinal separation will have to be taken into consideration for various multi-axle vehicles, e.g. three small tire dual axles on a car-hauler may require a different cleat configuration than would a typical 18-wheel tractor-trailer. In either situation, however, the longitudinal separation between left and right lane arrays must only limit contact across one axle at a time.

Figure 3:
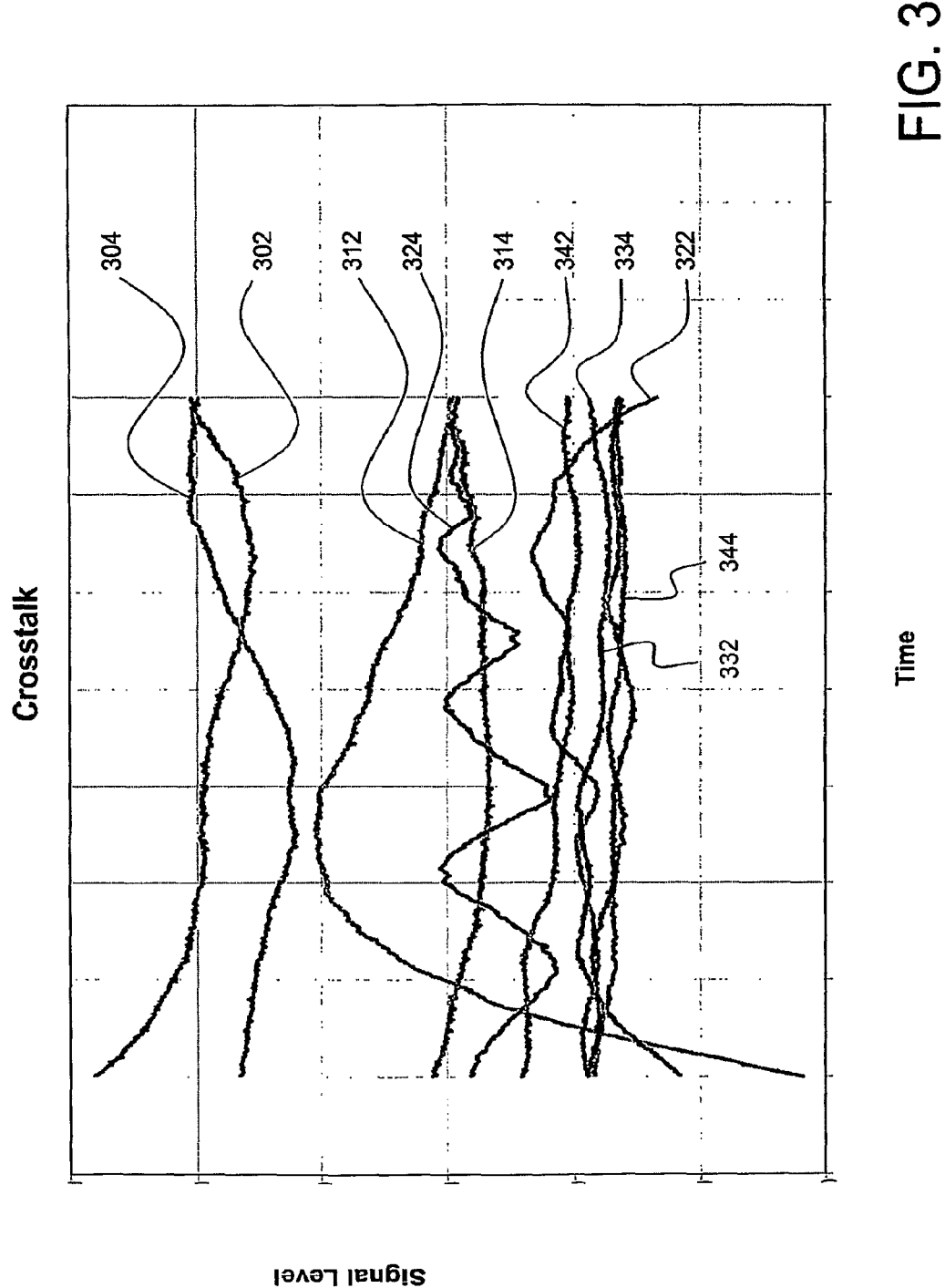
FIG. 3 graphically illustrates mechanical crosstalk among all wheel positions of a tractor-trailer combination.

With reference now to FIG. 3, there are graphically illustrated signals produced by mechanical crosstalk among all wheel positions of a tractor-trailer combination. Mechanical crosstalk is manifested as a cleat signal showing up in another wheel position at the same time through load transfer through the vehicle suspension system but is limited to one axle.

Figure 5:
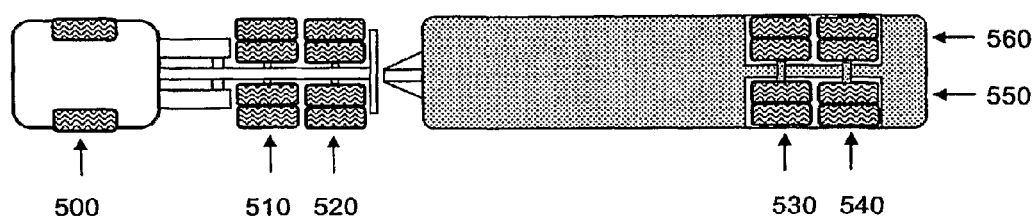
FIG. 5 illustrates relative wheel locations among portions of a conventional 18-wheeler tractor-trailer combination.

With brief reference to FIG. 5, various wheel positions on a tractor-trailer combination may be identified as steer wheels 500, drive wheels one 510, drive wheels two 520, trail wheels one 530, and trail wheels two 540. Left and right sides of the tractor-trailer combination may be identified as 550 and 560, respectively. With these references and with reference to FIG. 3, mechanical crosstalk signals may be identified as follows: left steer 302, right steer 304, left drive one 312, right drive one 314, left drive two 322, right drive two 324, left trailer one 332, right trailer one 334, left trailer two 342, and right trailer two 344. In this illustration, it will be understood that wheels in the position identified as right drive two 324 are passing over a cleat.

Figure 4:
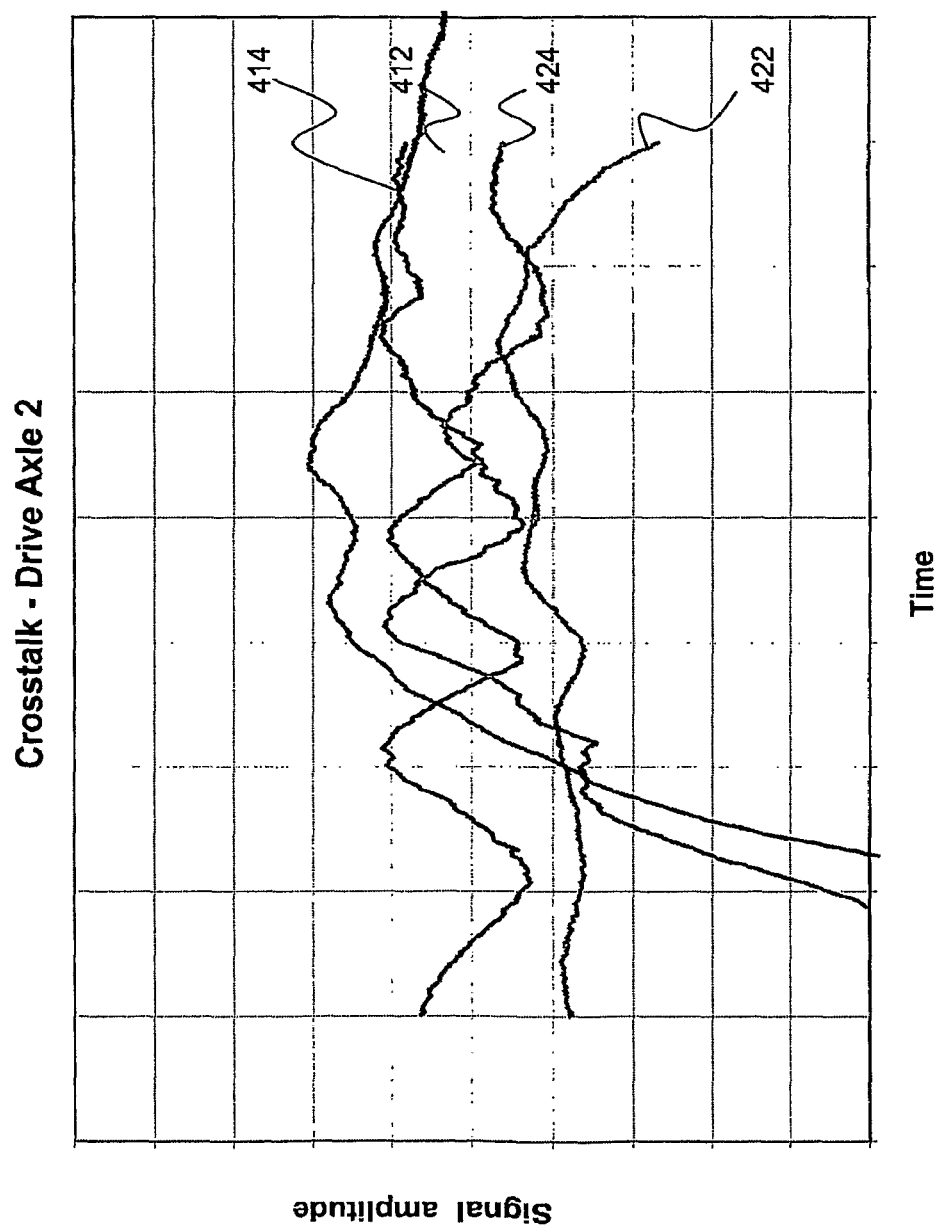
FIG. 4 graphically illustrates mechanical crosstalk on the second drive axle of the tractor as illustrated in FIG. 1.

Mechanical crosstalk may be advantageous since the dual pair signal on the same axle opposite the dual-alternating-load effect occurs at the same time, is similar in amplitude, but is in-phase as opposed to dual-alternating. For example, as illustrated in FIG. 4, crosstalk for drive axle two at wheel position 520 may be seen as corresponding to signal traces 414 representing an exemplary signal from the first tire of the right dual pair, signal traces 412 representing an exemplary signal from the first tire of the left dual pair, signal traces 424 representing an exemplary signal from the second tire of the right dual pair, and signal traces 422 representing an exemplary signal from the second tire of the left dual pair. In this exemplary configuration, tire one of the right dual pair (represented by signal trace 414) is hitting a cleat.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for automatically determining wheel mounting locations of tires mounted on a vehicle, each tire containing a shape change sensitive sensor associated with a unique identification, comprising:
    directing the vehicle along a predetermined travel path;
    providing a designed cleat array of tire shape change inducing obstacles along the predetermined travel path;
    gathering data indicative of a cleat waveform from each sensor;
    associating gathered data with the individual sensor's unique identification; and
    analyzing the gathered data combined with knowledge of a geometry of the cleat array to determine the mounting location of one or more tires on the vehicle.

2. The method of claim 1, further comprising:
    initiating gathering of data from each shape change sensitive sensor prior to tire contact with the tire shape change inducing obstacles.

3. The method of claim 2, wherein providing a designed cleat array of tire shape change inducing obstacles comprises:
    providing a plurality of obstacles in each of a left lane and a right lane of said travel path.

4. The method of claim 3, wherein said vehicle comprises a plurality of axles on each of which are mounted at least two tires, further comprising:
    aligning said plurality of obstacles such that tires mounted on any one axle will not contact obstacles in both the left and right lanes of said travel path at the same time.

5. The method of claim 4, further comprising:
    positioning the plurality of shape change inducing obstacles at a non-perpendicular angle to the direction of the travel path.

6. The method of claim 4,
    wherein the shape change inducing obstacles are non-uniformly sized obstacles.

7. A system for automatically determining wheel mounting locations of tires mounted on a vehicle, comprising:
    an electronic control unit associated with said vehicle;
    a designed cleat array containing a plurality of obstacles,
    a shape change sensitive sensor associated with each tire mounted on said vehicle;
    wherein said electronic control unit is configured to receive data indicative of a cleat waveform from each shape change sensitive sensor, said electronic control unit further configured to analyze the data combined with knowledge of a geometry of the cleat array to determine the mounting location of one or more tires on the vehicle.

8. The system of claim 7, wherein the plurality of shape change inducing obstacles are non-uniformly sized obstacles.

* * * * *